United States Patent [19]

Crowe

[11] Patent Number: 4,537,737
[45] Date of Patent: Aug. 27, 1985

[54] METHOD AND EQUIPMENT FOR PROCESSING A PLASTICIZABLE MATERIAL

[76] Inventor: Anthony Crowe, Langgarbenstrasse 18, CH-4416 Bubendorf, Switzerland

[21] Appl. No.: 531,761

[22] Filed: Sep. 13, 1983

[30] Foreign Application Priority Data

Oct. 1, 1982 [CH] Switzerland .................. 5814/82

[51] Int. Cl.³ .................................................. B29C 17/00
[52] U.S. Cl. .................................... 264/40.4; 264/148; 264/102; 264/163; 264/323; 425/113; 425/142; 425/202; 425/209
[58] Field of Search ............... 425/142, 202, 209; 264/40.4, 148, 163, 328.5, 328.17, 102

[56] References Cited

U.S. PATENT DOCUMENTS

| | | | |
|---|---|---|---|
| 2,774,104 | 12/1956 | Miller | 425/587 |
| 3,050,779 | 8/1962 | Farley | 425/207 |
| 3,298,061 | 1/1967 | Pomper | 425/568 |
| 3,375,553 | 4/1968 | Criss | 425/587 |
| 3,477,101 | 11/1969 | Fritsch | 425/150 |
| 3,526,688 | 9/1970 | Shelton et al. | 264/102 |
| 3,695,575 | 10/1972 | Hauser | 425/207 |
| 3,774,890 | 11/1973 | Lemelson | 425/202 |
| 3,873,661 | 3/1975 | Kontz | 264/102 |
| 4,120,630 | 10/1978 | LaSpisa et al. | 425/142 |
| 4,141,678 | 2/1979 | Jex | 425/145 |
| 4,240,997 | 12/1980 | Jex | 425/145 |

FOREIGN PATENT DOCUMENTS

| | | | |
|---|---|---|---|
| 1142230 | 1/1963 | Fed. Rep. of Germany | 264/328.17 |
| 2934147 | 3/1981 | Fed. Rep. of Germany | 264/102 |

OTHER PUBLICATIONS

Modern Plastics Encyclopedia for 1964, Sep. 1963, Figure 5.

Primary Examiner—Jeffery Thurlow
Assistant Examiner—Patrick Dailey
Attorney, Agent, or Firm—Ladas & Parry

[57] ABSTRACT

A plasticizing screw (4) is used to feed raw material (rubber compound) in the cold state into a cylinder (2). The material is plasticized and warmed up by the screw (4). The cylinder (2) is constructed so that the raw material fed into the cylinder can by retraction of the piston flow through a non-return valve into the front of the piston. The piston then extrudes the material through a die. On leaving the die, the material is cut into blanks, using a cutting mechanism (11).

Material in the cold state can be fed directly into the cylinder tanks to the plasticizing screw (4), which plasticizes and preheats the material. Volume control is achieved automatically in dependence with the advance of the piston (FIG. 1).

3 Claims, 3 Drawing Figures

→ RUBBER
--→ AIR

METHOD AND EQUIPMENT FOR PROCESSING A PLASTICIZABLE MATERIAL

This invention concerns a method of processing a plasticisable material, whereby the material is preheated and plasticised by kneading, and finally by using a piston is extruded from a cylinder and cut into exact metered volumes. The invention covers furthermore equipment, which enables this method to be used.

The known machines used for processing raw rubber to semi-finished products require in addition to the extrusion equipment a separate mill, which must be operated by an additional operator, on which strips or sheets of rubber compound are preheated and plasticised. After this expensive pre-treatment, in order to load the machine, at first the ram must be retracted, the head containing the die has to be opened and the rubber compound is pushed into the cylinder, the head is closed and then the vacuum is applied. Only then can the ram be brought into a forward movement.

A further problem with existing machines of this kind is obtaining the most exact possible constant volume for the blanks, which are blanks used in moulding. According to a well known method this volume is achieved via a hydraulic circuit, whereby the accuracy is dependent on a good uniform plasticity of the compound, that is dependent on the heating and the kneading used.

For this reason it is according to this well known method absolutely necessary to preheat the raw rubber compound on an additional machine (a mill) to a relatively high temperature of 80° C. The associated energy used must be evaluated higher because the blanks must be cooled before storage.

To cut the semi-finished product, which is extruded through the die, one uses according to a known method a continuously circulating knife, for which several fixed speeds are available. Experience shows that when using this method to cut thicker parts, with the lower cutter speed this results in deformed and oblique blanks, because the rubber presses against the knife slowing it down. It would therefore be an advantage if the cutting operation was not periodical, i.e. dependent on the speed of the cutter, if the cut only occurred when the preselected volume has been reached. Furthermore, using a periodical rotating cutter, the length of the blank is limited.

It is also known that with equipment it is necessary periodically to open the machine head containing the die in order to fill the machine, so that the die cools, which is also a loss of time and energy and can lead to rejects when restarting. The aim should be to try to limit rejects if possible to the first and possibly the last blank cut.

A further disadvantage of the known equipment is that the production speed cannot be changed without stopping the machine and causing rejects on start-up.

It is therefore the task of this invention to propose a method and equipment for processing rubber compound to semi-finished products, which eliminates the disadvantages of the known equipment being used at this time. The equipment must need a minimum of service and operate almost continuously and automatically, with precise volume control derived from the forward movement of the piston. It will be possible to feed the machine with cold material, thereby saving energy and personnel.

"Cold" material can be defined as a plasticisable material, in particular rubber compounds, which prior to feeding into the preformer have not undergone any plasticising or preheating operation and are therefore practically at room temperature.

This task is solved by the method defined in the independent patent claim 1 as well as claim 7, whereby the task is accomplished by the preformer described.

BRIEF DESCRIPTION OF THE DRAWINGS

Attached are drawings describing the operation of the invention as follows:

FIG. 1 shows a preformer, in its totality with 1 the machine frame, on which are mounted the various equipments required to carry out the methods according to the invention. The extrusion cylinder 2, given in the following description as cylinder, is connected via a loading chamber 3 to a feed and plasticising screw 4. The piston rod 6 in cylinder 2, part of the piston 5 (FIG. 2), is connected to the drive piston (not visible) of a hydraulic unit, which is driven by a motor M and a hydraulic pump 8. Also the plasticising screw 4 is connected to a hydraulic drive 4a, which causes the screw to turn. The loading chamber 3, which is positioned between the plasticising screw 4 and the cylinder 2 has a hydraulic latch 9, so that for cleaning it can be opened without difficulty.

Figure 1:
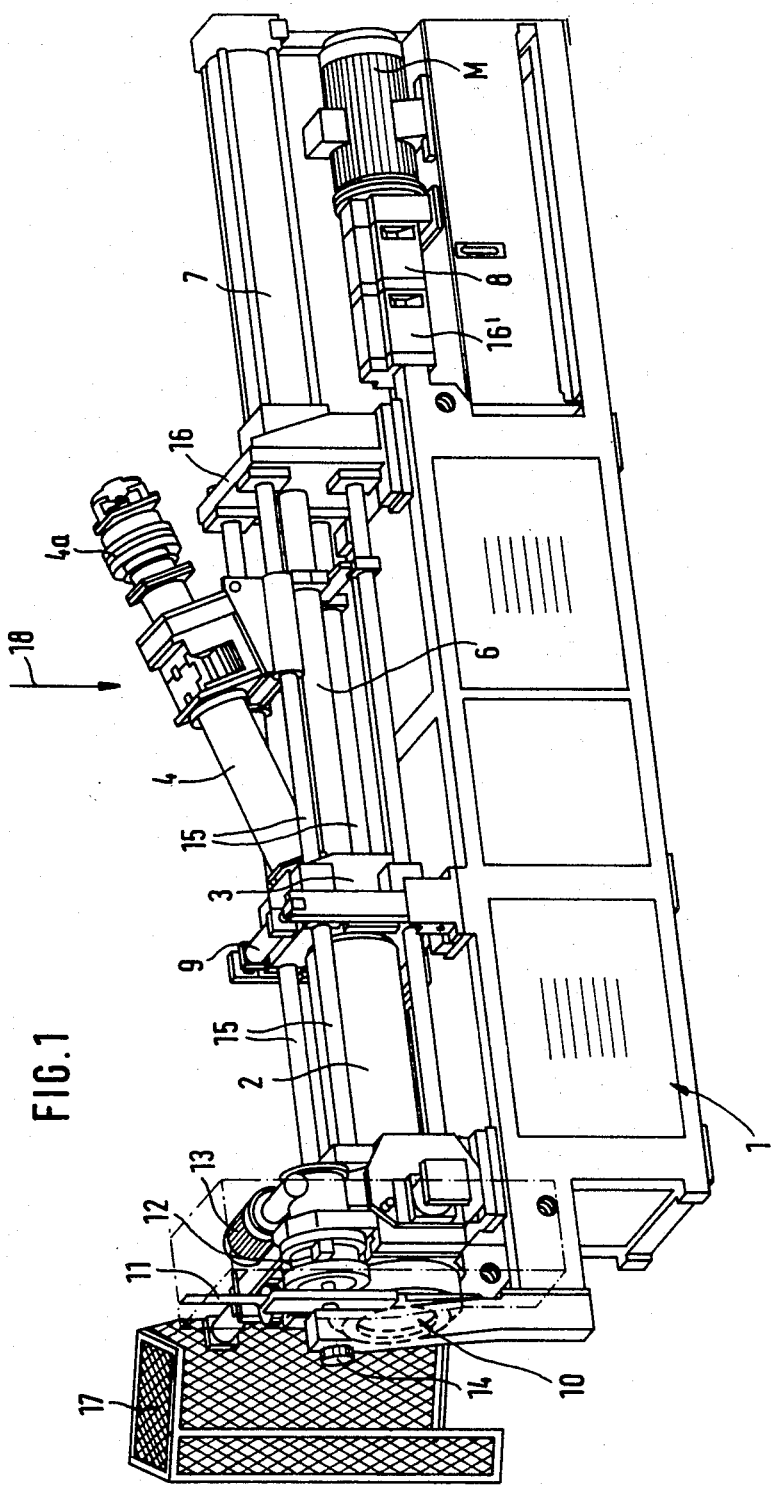
FIG. 1 is a simple perspective representation of the invented preformer for processing rubber compounds.

At the cylinder opening 2 opposite end to loading chamber 3 is the machine head and die holder 10, into which can be affixed a die to give the required shape to the semi-finished product. A cutting mechanism 11 is fitted to the area where blanks are extruded. This functions by means of a magnetic brake-coupling system, which is connected to a drive motor 13. The cutting knife 11 can be adjusted by means of a wheel 14.

Tie rods are fixed between the loading chamber 3 and the die holder 10; these extend also over the area of the plasticiser screw 4, at the end of which is a vertical plate 16, to which the tie rods are affixed.

A drive unit 4a is provided for the rotating plasticising screw 4, this is fed from a hydraulic pump 16, which is in turn driven from motor M. The hydraulic connections are not shown in FIG. 1.

A protective guard 17 with sheet metal covers is provided. The machine part in front of the cylinder 2, i.e. cutting head is completely covered.

When in operation, the machine is fed with raw material, in this case rubber compound, and this is fed in the direction of arrow 18 to the plasticising screw 4. This takes place while the preformer is working; the plasticising operation warms the rubber compound and thereby prepares it for the next processing operation. Thanks to this feed and plasticising screw 4 it is possible to feed cold material, in contrast to existing known machines, where this is not possible, so that here it is no longer necessary to preheat the material in a completely separate operation on a separate mill.

Figure 2:
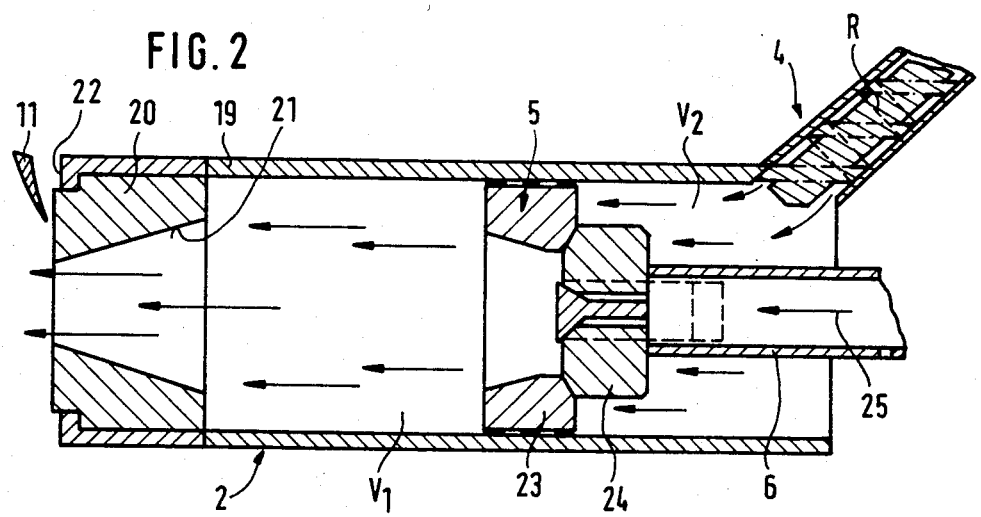
FIG. 2 is a cross-section arrangement of the ram and cylinder.
Figure 3:
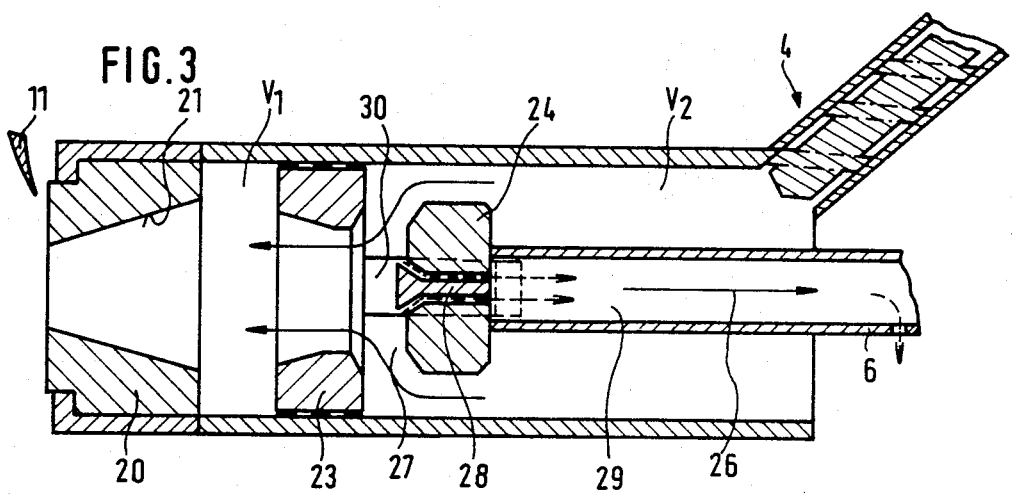
FIG. 3 shows ram and cylinder in a further operational stage.

For further understanding of the system invented it is now necessary to observe the construction of the cylinder 2 on FIGS. 2 and 3. As FIG. 2 shows, we have a main cylinder 2, on the front of which is a die 20, which has an opening 21 according to the contour of the semi-finished product (blank) cut in it. The die 20 is held in place by a die holder 22. Just in front of the die 20 the cutter 11 is shown.

The piston 5 consists of an outer ring 23 and a centre piece 24. The centre piece 24 can be slid in an axial direction from the ring 23, however, the sliding distance is limited so that the ring, which is connected to the piston rod 6, moves too when the centre piece slides. In the operational phase see FIG. 2, it is assumed that the piston is moving in direction of the arrow 25, i.e. to the left. In front of the piston in the part of the cylinder marked V1, there is rubber compound, which is being pushed through the die 21. In the cylinder part to the right of the piston marked V2 one can see the feed and plasticiser screw 4, which is feeding in the cylinder rubber compound R. As can be seen in FIG. 2, the centre piece 24 is in such a position against the ring 23 that rubber cannot pass from chamber V2 to chamber V1.

As soon as the piston reaches its end point (left), it changes direction, retracts and moves in the direction of arrow 26 (FIG. 3). Thereby the centre piece 24 frees itself from the ring 23 and there is a gap 27. During the retract movement, rubber flows through this gap from chamber V2 to chamber V1. The both piston parts 23 and 24 form a kind of non-return valve, which allows the flow of the rubber compound from chamber V2 into chamber V1 only during retract movement. During this retract movement the plasticiser screw 4 can be stopped, however, it is possible for the plasticiser screw 4 to work continuously.

In the piston centre piece 24 there is also a non-return valve 28, this is connected via the hollow piston rod 6 to the hole in the piston rod 29. During the retract movement of the piston according to FIG. 3, the valve head 28 lifts from its closed position, so that air can flow through the hollow piston rod 6. The air flow is indicated by broken arrows in FIG. 3.

The movable connection between piston centre piece 24 and piston ring 23 can be resolved by experts in various ways. In the present form there is a slide piece 30 between both parts, the centre piece is guided by this.

As can be seen, this preformer, in contrast to known existing machines, can be loaded or fed during the extrusion operation. This of course leads to considerable savings in time, energy and manpower. Also this eliminates the need to use a mill, which is an additional machine.

In the production of parts from rubber compound or similar plasticisable materials, in our experience it is very important for each part produced to have exactly the same volume. This is achieved by this invention during the linear forward movement of the piston, for example for every 0,005 mm travel a control impulse is recorded and can be evaluated and used for the completion of the process. The cutter 11 only operates in dependence with the forward movement of the piston. The cutter 11 will operate when a previously selected number of impulses has been reached.

The starting point and feed time of the plasticising screw 4 can be determined in the case of intermittent feed, in dependence with the forward movement of the piston. Thanks to this kind of control system it is not only possible to produce every single part to high precision, but also according to the required length.

On the basis of the pre-selected number of impulses and the continuous emmission of impulses during the forward movement of the piston, the piston speed is automatically controlled via the hydraulic control system. Due to this measurement of the piston speed and the control of the cutter 11 and/or plasticiser screw 4 in dependence with the piston advance, the exact weight or volume of the blanks is guaranteed.

A vacuum connection is made via a hole in the piston rod 6, see FIG. 3, so that when the piston advances in chamber V1, air is sucked out through the piston rod. The path of the extracted air is shown with broken arrows. Examples given here to describe the invention and machine are devoted to rubber compounds, however, this method and machine can be applied to other plasticisable materials, such as polyurethene, ebonite, silicone, etc.

The examples described show the feed and plasticiser screw 4 fitting into the extrusion cylinder 2. Between chamber V2 and V1 is the piston 24. In this case a non-return valve must be fitted either in the piston 24 or in the ring 23. Such a non-return valve would, however, not be required if the plasticiser screw 4 fed directly into the front of the extrusion cylinder 2, positioned between the die 20 and the piston 5. Using this method of feeding, a valve would be required to open when feeding and close when feeding stops. The compound fed into the cylinder using this method would be periodically extruded. This type of feed system would be of particular interest for small machines.

In the place of a feed and plasticising screw 4, other feed equipment could be used, for example a large enough gear pump.

I claim:

1. A preformer for processing rubber compounds into a semi-finished rubber blank, whereby the rubber compound which is preheated and plasticised by kneading and finally is extruded through a die out of cylinder using a piston and is cut in exact metered volumes, characterized by the fact that a piston extruder (2) has at its free end a die (20) as well as inside of a cylinder (19) there is a movable piston (5), whereby the piston is connected to a drive (6), with the purpose of moving the piston back and forwards and further a feed and plasticising unit (4) is provided, which fits into the cylinder (19), so that the cold material fed into the feed and plasticising unit (4) is only preheated and plasticised shortly before entry into the cylinder (19) and thereafter can be pressed through the piston head, the piston (5) containing a non-return valve (23,24), which permits during operation the transfer of material fed into the cylinder (2) from one cylinder side (V2) to the other (V1), but only during the return stroke of the piston, whereby in the cylinder part (V2) which lies at the opposite end to the die (20), said feed and plasticiser unit (4) feeds in a way that the rubber compound shortly before entering the extrusion cylinder (2) is preheated and plasticised, the piston rod (6) containing a hole to which is connected on one side a vacuum source, on the other side a non-return value (28), which opens to the die side of the cylinder (V1), so that the air in the cylinder area is sucked out.

2. A method for the processing of a rubber compound from raw rubber material to produce a semi-finished rubber blank, the steps comprising
feeding and plasticising the rubber compound in a cold state in a feed and plasticiser unit,
preheating by kneading and plasticising and finally extruding the rubber compound out of a cylinder and through a die by means of a piston, transferring material fed during operation into the cylinder from one cylinder side which lies at the opposite end to the die to the other cylinder side by means of a non-return valve of the piston unit feeding the rubber compound into the cylinder shortly after the rubber compound has been heated and plasticised, and cutting the rubber compound into exact metered volumes.

3. A preformer for processing rubber compounds into a semi-finished rubber blank comprising a feed and plasticising unit through which cold raw rubber material is fed, preheated and plasticised therein, a cylinder being connected at one end to said feed and plasticising unit and having a die at its other end, a movable piston located inside said cylinder, said piston being connected to a drive for moving said piston backwards and forwards to press said rubber compound in said cylinder through said die, and a cutter for cutting the rubber compound extruded through said die into exact metered volumes, the piston including a non-return valve which permits during operation the transfer of material fed into the cylinder from one cylinder side, which lies at the opposite end to the die, to the other cylinder side, and said feed and plasticiser unit feeds the rubber compound into the cylinder shortly after the rubber compound has been heated and plasticised.

* * * * *